United States Patent [19]
Christensen

[11] 3,967,349
[45] July 6, 1976

[54] CLAMP FOR FLEXIBLE ROPE

[75] Inventor: Donald E. Christensen, Orofino, Idaho

[73] Assignee: David Gladhart, Pierce, Idaho ; a part interest

[22] Filed: Apr. 11, 1975

[21] Appl. No.: 567,289

[52] U.S. Cl. .............................. 24/134 KC; 24/133; 24/132 WL
[51] Int. Cl.² ......................................... F16G 11/00
[58] Field of Search..... 24/134 KD, 134 KC, 134 E, 24/134 EA, 134 KB, 134 KA, 132 WL, 133; 254/156, 195

[56] References Cited
UNITED STATES PATENTS

| | | | |
|---|---|---|---|
| 1,105,624 | 8/1914 | Davis | 24/134 E |
| 1,449,945 | 3/1923 | Jacobsen | 24/134 L |
| 2,010,286 | 8/1935 | Wiener | 24/134 KC |
| 2,423,977 | 7/1947 | Hunter | 24/134 KC |
| 2,933,157 | 4/1960 | Huber | 24/133 |
| 3,260,507 | 7/1906 | Hughes | 24/134 R |

FOREIGN PATENTS OR APPLICATIONS 789,052   10/1935   France .................................. 24/134

*Primary Examiner*—Bernard A. Gelak
*Attorney, Agent, or Firm*—Wells, St. John & Roberts

[57] ABSTRACT

A self-tightening clamp assembly may be selectively positioned along a flexible rope to provide a rigid stop thereon. The clamp assembly includes a clamp housing having a clamping surface and a movable clamp plate located therein on opposite sides of the rope. The clamp plate is urged against the rope by a lever and cam surface to clamp the rope against the clamp surface. A connecting assembly is provided at a rearward end of the lever that may be connected to the flexible rope so the lever will pivot in response to tensioning and loosening of the rope between ends. As the rope moves to a taut position, the lever automatically moves the clamp plate toward the clamp surface, tightly clamping the rope therebetween. As the rope is relaxed, the lever releases pressure against the clamp plate and therefore loosens its grip on the rope.

4 Claims, 5 Drawing Figures

CLAMP FOR FLEXIBLE ROPE

BACKGROUND OF THE INVENTION

The present invention is related to rope clamping devices and more particularly to rope clamps that may be securely clamped against a section of flexible rope without external support.

Rope clamp assemblies are often utilized in material conveying systems wherein a stop means is required along a suspended length of rope to provide an actuator or an abutment for a movable carriage. Often, the stop must be very securely fastened to the rope to remain stationary along the rope when engaged by a moving carriage or other cooperating apparatus. It has often been desired to obtain a clamp assembly that will hold itself in a stationary position along the length of a taut, suspended rope without being permanently fixed thereto. Ordinarily where it is important that a stop remain stationary, a permanent stop is located in the desired position along the rope length. Obviously, such permanently located stops do not provide the versatility of a movable clamp assembly. An additional disadvantage of some movable clamp assemblies is that they tend to become loose on the attached rope as it is brought to a taut condition between ends.

U.S. Pat. No. 1,710,697 discloses a rope controller that is fixed to an independent support and operates in response to movement of a lever and cam mechanism to alternately forceably clamp and release a rope extending therethrough. This mechanism allows the rope to move past the clamping elements only when held in a taut condition and moved angularly relative to the rope portion on another side of the clamp. The lever is operated as the rope moves angularly to actuate the cam, pivoting it from engagement with the rope. No means is provided to tighten the clamp as the rope is tightened on opposite sides thereof.

The U.S. Pat. No. 325,983 discloses a suspender clutch pulley. The overhead supported pulley includes a pivoted clamp plate actuated by a downwardly depending arm for engaging a rope. The position of the clamp plate pivot axis is such that, as the rope on one side of the pulley is moved radially away from the pulley axis, the clamp plate is likewise moved as the rope engages the actuating lever. This outward movement releases clamping force between the clamp plate and pulley. This apparatus will not tighten itself about the rope as tension is applied to both rope ends on opposite sides of the clamp. It is responsive to angular movement of the rope to enable engagement and disengagement of the clutch assembly in order to release and clamp the rope against the pulley.

U.S. Pat. No. 1,656,113 discloses a clothesline holder for holding a clothesline tight between two spaced supports. A clamp assembly is mounted to one stationary support and receives one end of the clothesline. The clothesline is threaded over a pulley and between two serrated clamp plates. A manually operable lever and an eccentric cam are pivotably mounted adjacent to one of the clamp plates so that selective movement of the lever urges the clamp plate against the rope to clamp it securely against the remaining clamp plate. Pivotal movement of the lever in another direction releases the clamping action. Again, the rope clamping function of this apparatus is like the above apparatus performed manually and not in response to tensioning of the rope between ends on opposite sides of the clamp assembly.

U.S. Pat. No. 2,175,977 discloses a cord locking mechanism for venetian blinds. Again, in this apparatus a clamp means is provided whereby the venetian blind cord may be selectively clamped against a stationary surface by angular movement of the venetian blind cord rather than by tensioning of the cord between ends. This apparatus does however utilize a lever actuating mechanism that is operatively connected to the cord on one side of the clamp and pivots in response to angular positioning of the cord to move a clamp plate to selectively engage the cord. The disclosed apparatus however, will not operate to tighten the clamping force on the cord if it is tensioned along a line on opposite sides of the clamp assembly.

U.S. Pat. No. 2,330,736 discloses a clamp utilizing a longitudinal clamp surface on one side of a cord with a movable clamp plate on the opposite side of the cord and connected by a parallelogram type linkage to an actuating lever. The lever may be moved longitudinally with respect to the cord in order to pivot the clamp plate toward and away from the clamp surface and thereby clamp and release the cord therebetween. Again, the clamping action must be accomplished by means other than simply bringing the rope to a taut condition on both sides.

None of the above apparatus disclose or teach utilization of a clamp assembly that automatically tightens itself in response to tensioning of a flexible rope on opposite sides thereof.

SUMMARY OF THE INVENTION

A self-tightening clamp assembly for flexible rope is described and includes a clamp body having a longitudinal opening extending therethrough from front to back. This opening receives a portion of a flexible rope so that the rope ends extend forward and rearward of the clamp assembly. Included within the clamp body is a clamp surface that extends longitudinally along one side of the opening for engaging the rope. A clamp plate is movably mounted to the clamp body on an opposite side of the opening for engaging the rope and clamping it against the clamp surface. Lever means is provided, pivotably mounted to the clamp body with one end thereof operatively connected to the clamp plate and with a remaining end projecting rearwardly from the clamp body. The lever means functions to move the clamp plate toward the clamp surface in response to pivotal movement of the remaining lever end. Connecting means is further provided for releasably securing the remaining lever end to the flexible rope so that as the rope is drawn to a taut condition between ends the lever is automatically operated to force the clamp plate toward the clamp surface and thereby clamp the rope tightly therebetween. In addition, as the rope slackens, the lever is automatically operated in response thereto to relax clamping pressure against the rope.

It is a first object of this invention to provide a self-tightening clamp assembly for flexible ropes that will operate in response to tensioning of the rope between ends to tightly clamp itself against the rope held therein.

A further object is to provide such an assembly that is relatively simple, includes few moving parts, and is therefore relatively maintenance free and inexpensive to purchase.

These and further objects and advantages will become apparent upon reading the following detailed description which, taken with the accompanying drawing, disclose a preferred form of the present invention.

DETAILED DESCRIPTION OF A PREFERRED EMBODIMENT

Figure 1:
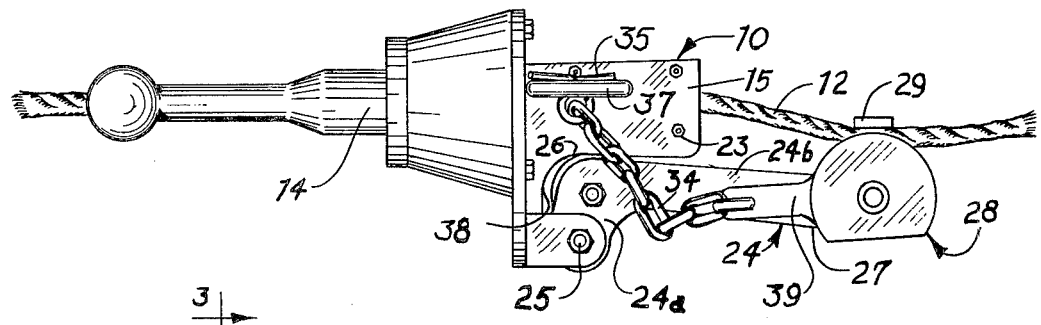
FIG. 1 is a pictorial side elevational view of the clamp assembly.
Figure 2:
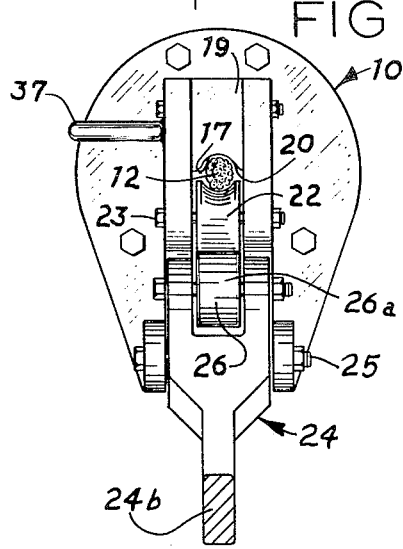
FIG. 2 is an enlarged fragmentary view as seen from the right in FIG. 1.

The clamp assembly generally indicated at 10 in the drawings is comprised of a central clamp body 15 that includes a longitudinal opening 17 therein for receiving a length of flexible rope 12. It may be noted that rope 12 extends completely through the clamp assembly with rope ends on forward and backward sides thereof. It may be further noted that support for assembly 10 is provided solely by the flexible rope 12.

FIG. 1 shows the clamp assembly 10 mounting an actuator member 14, exemplifying utilization of the present assembly. Such an actuator member 14 may be utilized to engage and operate various mechanisms of an associated device, usually a carriage or other conveying type apparatus that moves along rope 12 or on a secondary rope suspended parallel to rope 12. It should be understood however, that it is not the purpose of this application to restrict the present clamp assembly to utilization with such actuator members 14, it being understood that assembly 10 may be utilized alone or various other mechanisms or devices may be attached to the clamp assembly for other equally suitable purposes. The thrust of this application is toward the clamp assembly itself and the elements contained therein for enabling the clamp assembly to tightly clamp itself to the rope 12 in response to movement of the rope to a taut condition between ends.

An insert 19 is provided within clamp body 15 that defines a clamp surface 20 located longitudinally along the opening 17. The clamp surface 20 is complementary to the shape of the rope 12 to prevent disfiguration and damage to the rope when tightly clamped thereto. Releasable fasteners are utilized to mount insert 19 within the clamp body 15 to enable its replacement when worn. The substantial length of clamp surface 20 exposed along an equal length of rope 12 provides a rather large frictional gripping surface for maximum resistance to movement along the length of rope 12 when securely engaged therewith.

Opposite clamp surface 20 is a clamp plate 22 mounted to clamp body 15 at a pivot 23. The clamp plate 22 is positioned on the opposite side of rope 12 from clamp surface 20 and extends from pivot 23 forwardly toward a lever means 24. The clamp plate means 22 is pivoted by lever means 24 to engage the rope 12 and clamp it securely against clamp surface 20. Clamp plate means 22 also includes a longitudinal recess complementary to the shape of rope 12.

Lever means 24 is L-shaped, having a short leg section 24a and a long leg section 24b. It is pivotably mounted to clamp body 15 at a point 25 spaced longitudinally from clamp plate pivot 23. Pivot 25 is located near the end of short leg section 24a. A roller 26 is rotatably mounted to lever 24 at the juncture of leg sections 24a and 24b. Roller 26 includes a peripheral cam surface 26a for engaging clamp plate 22.

Upward pivotal movement of long leg section 24b (with respect to FIGS. 1 and 3) results in corresponding upward clamping movement of the forward end of clamp plate 22. Clamping force produced by this upward movement greatly increases as the cam surface 26a moves upwardly and longitudinally toward the stationary pivot 25 (which serves as the fulcrum). Additionally, as cam surface 26a moves forwardly over clamp plate 22 the lever arm increases in length from clamp plate pivot 23 to the point of contact with roller 26. This correspondingly increases clamping pressure adjacent pivot 23.

Figure 3:
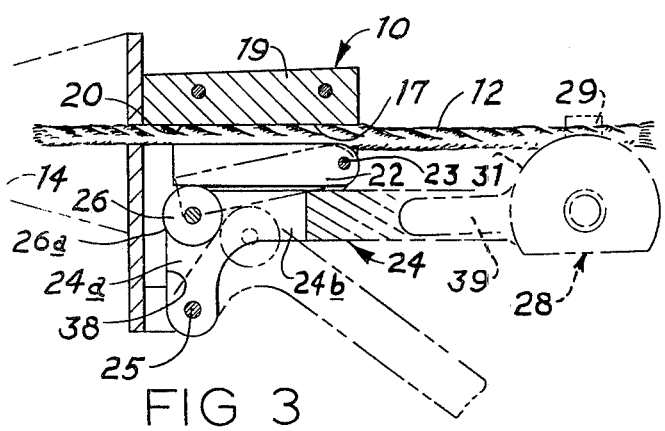
FIG. 3 is a sectioned view taken longitudinally through the clamp assembly along line 3—3 in FIG. 2 and showing alternate positions of the elements therein.

A position of maximum clamping force is shown by FIG. 3 in solid lines wherein the pivot 25 and the axis for roller 26 are vertically aligned. An abutment surface 38 on clamp body 15 is engagable with short leg section 24a to prevent pivotal movement of lever means 24 past this condition.

Figure 4:
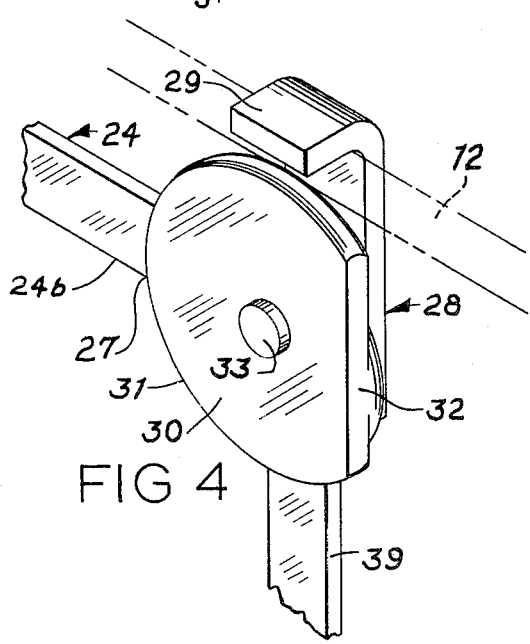
FIG. 4 is a pictorial fragmentary view illustrating the connecting means in a first position.
Figure 5:
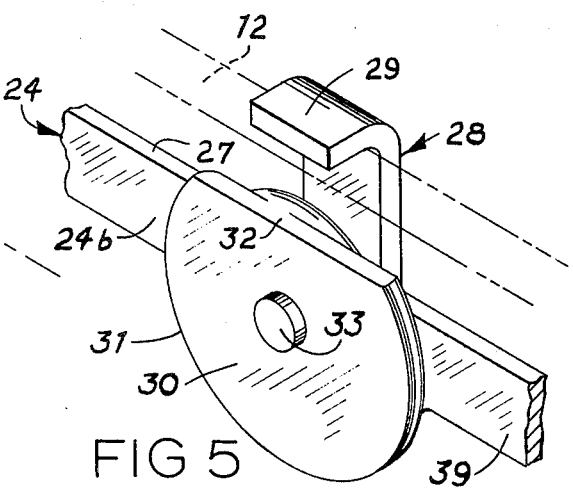
FIG. 5 is a pictorial view similar to FIG. 4 only showing a different operational position of the connecting means.

A connecting means 28 is located at a rearward lever end 27 for connection with rope 12 rearward of the remainder of clamp assembly 10. Connecting means 28 is comprised of a hook 29 and a pivotable plate 30 located at lever end 27. Hook 29 is formed integrally with lever end 27 for engaging rope 12. Plate 30 is semi-circular having a generally circular edge 31 extending between ends of a flat edge 32. The plate 30 is freely pivotably mounted to the lever end 27 by a pivot pin 33. The circular edge 31 is formed on a radius from pin 33 that is substantially equal to the radial distance from pin 33 to the inside edge of hook 29. The distance from pin 33 to flat edge 32 however is substantially less than the radius to the arcuate surface 31. This arrangement provides a safety feature as illustrated in FIGS. 4 and 5 whereby inadvertent disengagement of rope 12 from connecting means 28 is prevented.

An additional safety feature is provided by a locking cross piece 35 that fits within a ring 37 on the clamp body 15. Cross piece 35 is connected by a chain 34 to an arm 39 extending from plate 30. The length of chain 34 is such that the plate 30 may not be moved from a locked condition (FIG. 1) without removing the locking cross piece 35 from ring 37. Should cross piece 35 become accidently disengaged from ring 37, (FIG. 4) a locked condition of the connecting means to the rope 13 would still exist. FIG. 4 illustrates the relative positions of plate 30 and hook 29 when locking cross piece 35 is allowed to hang freely on arm 39. As may be noted, the circular edge 31 is located closely adjacent to hook 29, preventing escape of the rope 12 from its position between the plate 30 and hook 29. In order to disconnect the rope 12 from connecting means 28, the plate 30 must be pivoted to bring the flat edge 32 substantially parallel with rope 12. By doing this, a gap is presented between hook 29 and edge 32 of sufficient dimension to enable disengagement of the rope from connecting means 28. This movement must be accomplished manually since plate 30 will not move under normal conditions to such an angular relationship.

In operation, the clamp assembly 10 is first mounted to flexible rope 12 by threading the rope 12 through the longitudinal opening 17 and connecting means 28. Once the clamp assembly 10 is located at a desired longitudinal position, the rope 12 may be brought to a taut condition. In doing so, the rope works against hook 29 to pivot lever end 27 upwardly. This motion also brings the cam surface 26a of roller 26 into working engagement with the clamp plate 22. Clamp plate 22 pivots in response to the arcuate movement of roller 26 about pivot 25. Mechanical advantage provided by the selective placement of the roller 26 adjacent to the lever pivot 25 enables transmission of considerable force to the clamp plate means 22 to securely clamp rope 12 against clamp surface 20. Additional mechanical advantage is gained as previously described by the spatial relationship between the clamp plate pivot 23 and roller 26. The clamping pressure between plate 22 and clamp surface 20 is greatest as rope 12 is tightened to a straightened condition along its length.

As tension is released along the length of rope 12, the lever section 24b is allowed to pivot downwardly to relax the intensified clamp pressure between clamp surface 20 and clamp plate 22. Some degree of clamp pressure will still remain, however, because of the angular position of connecting means 28 on rope 12. Therefore, in order to completely release clamp pressure within clamp body 15, the user must disengage connecting means 28 from the slackened rope 12 and pivot lever 24 downwardly to completely loosen clamp plate 22 from rope 12. After doing this, the user may slide the assembly 10 to any desired position along the length of rope 12 and reconnect the rope and connecting means 28 to again apply sufficient clamping force against the rope to hold assembly 10 in place. Once the rope is again tensioned, the lever 24 is again pivoted upwardly to apply a greater clamping force to the rope 12 at that location.

It may have become obvious from the above description and attached drawings that various changes and modifications may be made therein. It is therefore intended that only the following claims be taken as definitions of the present invention.

What I claim is:

1. A self-tightening clamp assembly for flexible rope, comprising:
   a clamp body defining a straight longitudinal opening extending therethrough from a front to a back end for receiving a portion of a flexible rope so that the ends thereof extend forward and backward of the clamp assembly;
   a clamp surface mounted to the clamp body to extend longitudinally along one side of the opening;
   clamp plate means pivotably mounted to the clamp body on an opposite side of the opening with a smooth clamp plate surface for pivoting about a first axis to engage the rope and clamp it against the clamp surface;
   lever means mounted to the clamp body for pivotal movement about a second axis spaced longitudinally from the first axis with one end operatively connected to the clamp plate and a remaining end projecting rearwardly from the clamp plate body for pivoting the clamp plate toward and away from the clamp surface in response to pivotal movement of the remaining lever end;
   connecting means for releasably securing the remaining lever end to the flexible rope so that as the rope is moved to a straightened condition with ends protruding from the assembly along a substantially straight line, the lever means is automatically operated to force the clamp plate toward the clamp surface and thereby clamp the rope tightly therebetween and so that as the rope is slackened between ends, the lever means is automatically operated to relax clamping pressure on the rope.

2. The self-tightening clamp assembly as set out in claim 1 wherein the lever means includes a cam surface thereon for engaging and moving the clamp plate in response to movement of said remaining lever end and wherein the cam surface is normally located between the first and second pivot axes so that when the lever is pivoted toward the rope, the cam moves in an arc toward the rope and away from the first axis.

3. A self-tightening clamp assembly as set out in claim 2 wherein the lever means is comprised of an L-shaped lever having a short leg section and a long leg section and wherein the lever is pivotably mounted at the end of the short leg section to the clamp body; wherein the cam surface is comprised of a roller rotatably mounted to the lever at the juncture of the short and long leg sections.

4. The self-tightening clamp assembly as set out in claim 1 further comprising safety lock means associated with the connecting means for preventing inadvertent disengagement of the remaining lever end from the flexible rope.

* * * * *